United States Patent
Chang et al.

(10) Patent No.: US 8,634,885 B2
(45) Date of Patent: Jan. 21, 2014

(54) MOBILE DEVICE HAVING A PLATE IN A GAP BETWEEN SLIDING BODIES

(75) Inventors: Kyewon Chang, Busan (KR);
Youngmin Kim, Suwon (KR);
Byoungchul Kim, Seoul (KR)

(73) Assignee: LG Electronics Inc., Seoul (KR)

(*) Notice: Subject to any disclaimer, the term of this patent is extended or adjusted under 35 U.S.C. 154(b) by 271 days.

(21) Appl. No.: 13/182,554

(22) Filed: Jul. 14, 2011

(65) Prior Publication Data

US 2012/0157172 A1    Jun. 21, 2012

(30) Foreign Application Priority Data

Dec. 21, 2010   (KR) .................. 10-2010-0131889

(51) Int. Cl.
*H04M 1/00*    (2006.01)

(52) U.S. Cl.
USPC ............. 455/575.4; 361/679.02; 361/679.3; 361/727

(58) Field of Classification Search
USPC .......... 455/575.1–575.4; 361/679.01, 679.02, 361/679.09, 679.26–679.28, 679.3, 361/724–727, 749
See application file for complete search history.

(56) References Cited

U.S. PATENT DOCUMENTS

| | | | |
|---|---|---|---|
| 7,656,662 B2* | 2/2010 | Chen | 361/679.55 |
| 8,107,235 B2* | 1/2012 | Yeh | 361/679.56 |
| 8,108,018 B2* | 1/2012 | Jung | 455/575.4 |
| 8,311,599 B2* | 11/2012 | Hikino | 455/575.4 |
| 2005/0221873 A1* | 10/2005 | Kameyama et al. | 455/575.4 |
| 2005/0255897 A1* | 11/2005 | Lee et al. | 455/575.4 |
| 2007/0270180 A1* | 11/2007 | Takagi | 455/550.1 |
| 2009/0029741 A1* | 1/2009 | Satou et al. | 455/566 |
| 2009/0069059 A1* | 3/2009 | Min et al. | 455/575.4 |
| 2011/0105204 A1* | 5/2011 | Kouno | 455/575.4 |
| 2011/0222248 A1* | 9/2011 | Sakai et al. | 361/749 |

* cited by examiner

*Primary Examiner* — Allahyar Kasraian
(74) *Attorney, Agent, or Firm* — KED & Associates, LLP

(57) ABSTRACT

A mobile terminal includes first and second bodies slidably connected in a closed configuration and open configuration, a flexible circuit board electrically connecting the first and second bodies and passing through a gap formed between the first and second bodies, and one or more blocking units disposed in a spatial area formed between an opening face of the gap to the flexible circuit board and formed to be protruded to traverse the gap from the first body toward the second body, wherein the blocking units are disposed in the spatial area to cover at least a portion of the flexible circuit board. When the mobile terminal is changed from an open configuration to a closed configuration, the flexible circuit board can be prevented from being damaged by a structure.

10 Claims, 6 Drawing Sheets

MOBILE DEVICE HAVING A PLATE IN A GAP BETWEEN SLIDING BODIES

CROSS REFERENCE TO RELATED APPLICATIONS

The present application claims priority to Korean Application No. 10-2010-0131889 filed on Dec. 21, 2010, the entire contents of which is hereby incorporated by reference in its entirety.

BACKGROUND OF THE INVENTION

1. Field of the Invention

The present invention relates to a mobile terminal having one body which slides with respect to another body.

2. Description of the Related Art

As functions of terminals become diversified, the terminals are implemented as multimedia players supporting complicated functions such as capturing images or video, reproducing music or video files, playing games, receiving broadcast signals, and the like. Recently, terminals receive a broadcast or multicast signal to allow users to view video or television programs.

Terminals may be divided into a mobile/portable terminal and stationary terminal according to whether or not they are movable. Mobile terminals are portable devices having one of more of a function of performing a voice and video call while being carried around, a function of inputting and outputting information, a function of storing data, and the like.

Efforts are ongoing to support and increase the functionality of mobile terminals. Such efforts include software and hardware improvements, as well as changes and improvements in the structural components which form the terminals.

SUMMARY OF THE INVENTION

An aspect of the present invention provides a mobile terminal devised to have a plate-like structure inserted in a gap formed between first and second bodies in an open configuration to thus prevent a flexible circuit board from being damaged, and have a large exposed portion of the second body in the open configuration.

According to an aspect of the present invention, there is provided a mobile terminal including: first and second bodies slidably connected in a closed configuration and open configuration; a flexible circuit board electrically connecting the first and second bodies and passing through a gap formed between the first and second bodies; and one or more blocking units disposed in a spatial area formed from an opening face of the gap to the flexible circuit board and formed to be protruded from the first body to traverse the gap toward the second body, wherein the blocking units are disposed in the spatial area to cover at least a portion of the flexible circuit board.

A manipulation unit including a plurality of key buttons arranged thereon may be formed on one surface of the second body.

A guide part may be formed between the key buttons to allow one end of each of the blocking units to move in a sliding direction.

The guide part may include an insertion recess allowing one end of each of the blocking units to be inserted therein.

The flexible circuit board may be formed to penetrate first and second openings formed at the first and second bodies, respectively, to electrically connect first and second electronic elements installed in the first and second bodies.

The mobile terminal may further include: a slide module formed to allow the first and second bodies to relatively move each other, wherein the slide module may include: a first slide unit mounted on the first body; and a second slide unit slidably connected to the first slide unit and protruded from one surface of the second body facing the first body.

The second slide unit may include: first and second slide rail units disposed to be spaced apart from each other and including rails facing to confine the first slide unit in a direction crossing the sliding direction.

The first and second slide rail units may include: a step face formed on one surface of the second body such that it is parallel to the one surface of the second body; and first and second guide rails formed at both corners of the step face and constituting the rails.

The second slide unit may be formed to be adjacent to an end portion, among end portions of the second body, which is relatively moved between both ends of the first body according to a sliding operation of the first body.

The first slide unit may include: a base plate mounted on the first body; first and second guide edges formed at both corners of the base plate; and first and second guide recesses formed between both corners of the base plate and extending in the sliding direction.

The second slide unit may include: a first slide rail unit slidably coupled to a face confining the first guide hole and the first guide edge; and a second slide rail unit slidably coupled to a face confining the second guide hole and the second guide edge.

The first slide unit may further include a rigidity reinforcing unit having at least a portion extending along the sliding direction to reinforce the strength, having both ends protruded from the base plate, respectively, and having a portion, between the both ends, covering at least one of the first and second guide holes.

According to an aspect of the present invention, there is also provided a mobile terminal including: a first body having a display unit formed on a front surface thereof to display visual information; a second body having a manipulation unit with a plurality of key buttons arranged on one surface thereof and slidably coupled to the first body to implement a closed configuration and an open configuration of the manipulation unit; a gap formed between the first and second bodies; and a blocking unit protruded toward the second body from the first body in order to push out an external structure through a sliding operation when at least a portion of the external structure is inserted to the gap, and formed to cover at least a portion of the gap.

A guide part may be formed between the key buttons to allow one end of the blocking unit to move in a sliding direction.

The guide part may include an insertion recess allowing one end of each of the blocking units to be inserted therein.

The mobile terminal may further include: a slide module formed to allow the first and second bodies to relatively move each other, wherein the slide module may include: a first slide unit mounted on the first body; and a second slide unit slidably connected to the first slide unit and protruded from one surface of the second body facing the first body.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by illustration only, and thus are not limitative of the present invention, and wherein.

DETAILED DESCRIPTION OF THE INVENTION

Figure 1:
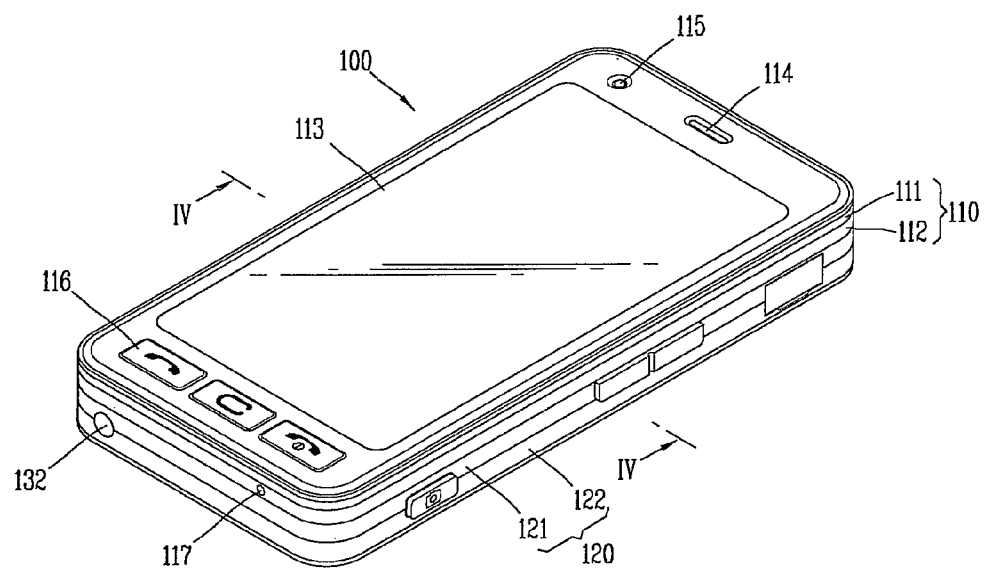
FIG. 1 is a perspective view showing a closed configuration of a mobile terminal according to an exemplary embodiment of the present invention.

Description will now be given in detail of the present disclosure, with reference to the accompanying drawings. The same reference numerals will be given to the same components as those of the aforementioned embodiment, and their explanations will be omitted. The singular expression of the present invention may include a plural concept unless distinctively differently defined.

Figure 2:
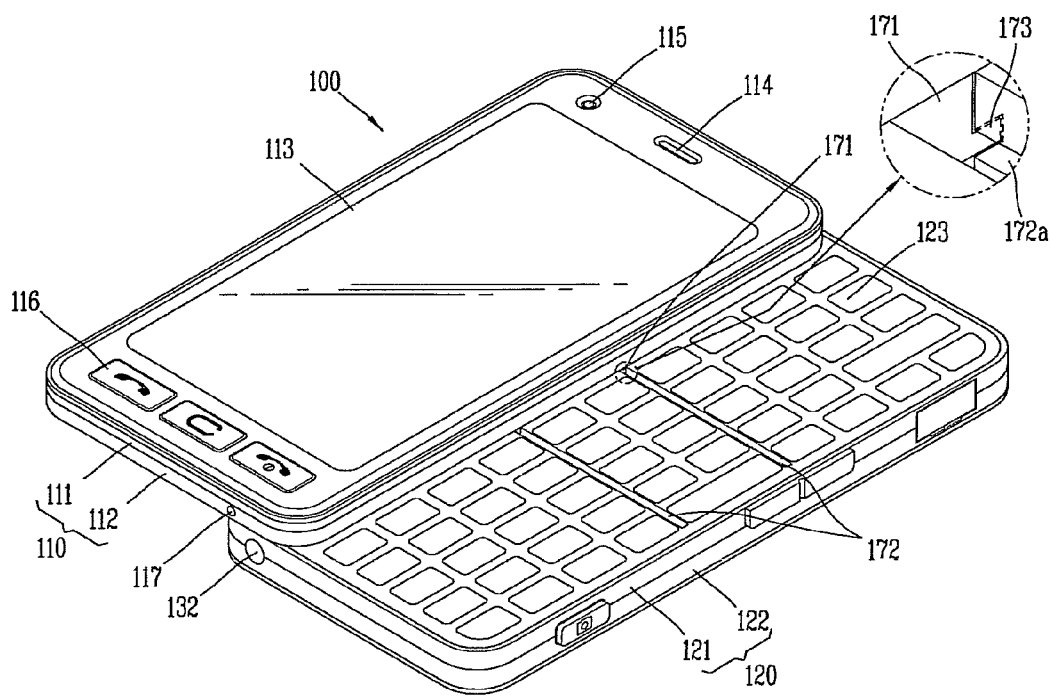
FIG. 2 is a perspective view showing an open configuration of the mobile terminal of FIG. 1.

FIGS. 1 and 2 are front perspective views of a mobile terminal according to an exemplary embodiment of the present invention. FIG. 1 shows a closed configuration of the mobile terminal and FIG. 2 shows an open configuration of the mobile terminal.

As shown in FIGS. 1 and 2, the mobile terminal 100 includes a first body 110 and a second body 120 which are coupled to be movable with respect to each other. The mobile terminal 100 illustrated in FIGS. 1 and 2 implements an open configuration according to a sliding movement in a widthwise direction (or in a horizontal direction). The present invention can be also applicable to a case in which an open configuration is implemented according to a sliding movement in a lengthwise direction (or in a vertical direction).

As shown in FIG. 1, a state in which the first body 110 is disposed to be overlaid with the second body 120 may be called the closed configuration, and as shown in FIG. 2, a state in which the first body 110 is moved in one direction to expose at least a portion of the second body 120 may be called the open configuration. In the present exemplary embodiment, 'sliding' is illustrated as the 'movement' of the first body 110 and the second body 120 with respect to a base 130, but the present invention is not limited thereto. For example, the mobile terminal may be configured such that any one of the first body 110 and the second body 120 may swing or swivel with respect to the other.

In the closed configuration, the mobile terminal 100 mainly operates in a standby mode (or idle mode), and the standby mode may be released upon user manipulation. The mobile terminal operates mainly in the call mode or the like in the open configuration, and the call mode can be changed to the standby mode with the lapse of time or upon user manipulation.

Functions or components which may be disposed on the upper surface of the first body 110 or that of the second body 120 may be various depending on which of them in the mobile terminal 100 is to be stressed or which of user interfaces is sought. For example, as shown in FIG. 2, the display unit 113 may be installed on the upper surface of the upper body 110, and a second manipulation unit 123 for an input or a control command may be installed on the upper surface of the lower body 120.

With reference to FIG. 1, a case (or casing, housing, cover, etc.) constituting the external appearance of the first body 110 is formed by a front case 111 and a rear case 112. Various electronic components are installed in the space formed by the front case 111 and the rear case 112. One or more intermediate cases may be additionally disposed between the front case 111 and the rear case 112. The cases may be formed by injection-molding a synthetic resin or may be made of a metallic material such as stainless steel (STS) or titanium (Ti), etc.

The display unit 113, the audio output unit 114, a first image input unit 115, a first manipulation unit 116, and an audio input unit 117, may be disposed on the first body 110, specifically, on the front case 111.

The display unit 113 may include a display module, e.g., an LED (liquid crystal display) module, an OLED (organic light emitting diode) module, a TOLED (transparent OLED) module, and the like, which visually displays information.

The display unit 113 may further include a touch screen allowing the user to input information in a tactile manner. For a call connection, the display unit 113 may output number keys which can be input through a touch.

The display unit 113 may be formed to generate various tactile effects felt by the user when touched. This can be implemented by a haptic module interworking with the display unit 113. A typical example of the tactile effect generated by the haptic module includes vibration. The haptic module may be variably disposed according to configurations of the mobile terminal 100, as well as at the display unit 113.

The audio output unit 114 may be implemented in the form of a receiver or a speaker. The first image input unit 115 may be implemented in the form of a camera module for capturing an image or a video of the user, and so on. The first manipulation unit 116 receives a command for controlling the operation of the mobile terminal according to an exemplary embodiment of the present invention. The audio input unit 117 may be implemented in the form of a microphone. The audio input unit 117 may be disposed to be symmetrical to the audio output unit 114 based on the display unit 113.

Like the first body 110, the front case 121 and the rear case 122 may form the second body 120. A second manipulation unit 123 (See FIG. 2) may be disposed on the second body 120, specifically, on the front face of the front case 121.

Besides an antenna for a call, or the like, a broadcast reception antenna 132 may be disposed at one side of the second body 120. The antenna 132 may be installed to be drawn out of the second body 120.

With reference to FIG. 2, when the first body 110 slides with respect to the second body 120, the second manipulation unit 123 disposed on the front surface of the second body 120 overlapping with the first body 110 in the closed configuration (i.e., the state of FIG. 1) is exposed with respect to the first body 110.

Keys of the exposed second manipulation unit 123 may be configured to receive an input related to content output from the display unit 113. The second manipulation unit 123 may include language keys (Hanguel consonants and vowels/English alphabets, etc.) and number keys, and the language keys may be disposed in a QWERTY array. Since the language keys are disposed in the QWERTY array, the user can easily create characters, memo, e-mail, or the like, in English.

When the second manipulation unit 123 is a touch screen, icons of function keys can be output such that they can be touch-input on the exposed portion of the touch screen. For example, when a video is output to the display unit 113, the function keys may be configured to receive a command for implementing functions such as a temporary stop, play, back, forward, a reproduction list, and the like.

In the above description, the second manipulation unit 123 is disposed on the front surface of the second body 12, but the present invention is not limited thereto. For example, a second display unit interworking with the display unit 113 may be disposed on the front surface of the second body 120.

Figure 3:
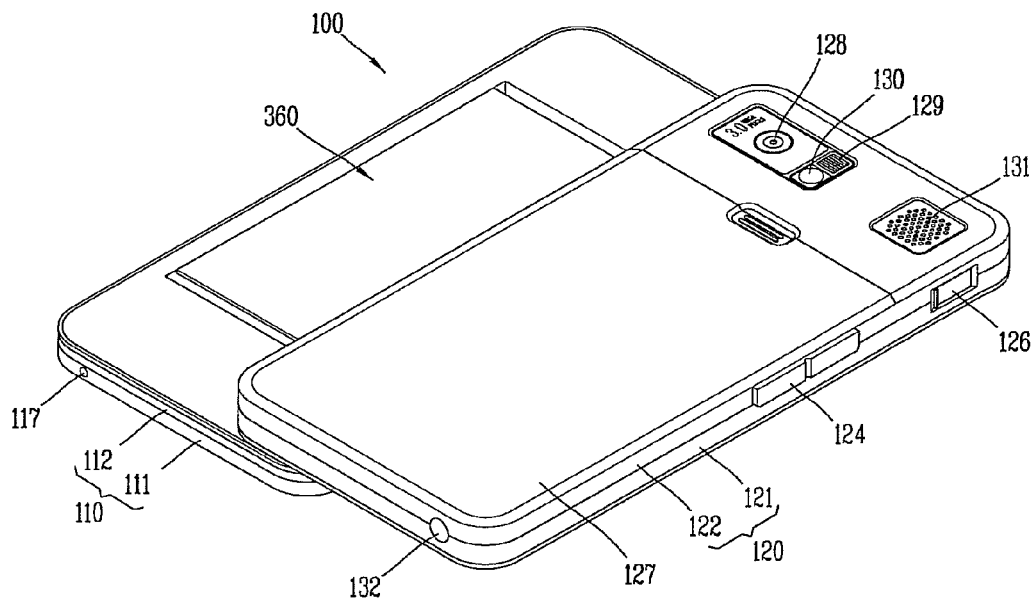
FIG. 3 is a rear perspective view of the mobile terminal of FIG. 2.

FIG. 3 is a rear perspective view of the mobile terminal 100 of FIG. 2.

With reference to FIG. 3, a third manipulation unit 124, an interface 126, or the like, may be disposed on the side surface of the second body 120.

The first to third manipulation units 116, 123, and 124 may be generally called user input units and may employ any method so long as it allows the user to perform manipulation in a tactile manner.

For example, the user input units may be implemented as a dome switch, a touch screen, or a touch pad that receive a command or information according to a push or touch manipulation by the user, or may be implemented in a manner to be manipulated by a wheel for rotating a key, a jog type, a joystick, or the like.

In terms of function, the first manipulation unit 116 may operate to input a command such as start, end, scroll, etc., the second manipulation unit 123 may serve to input numbers, characters, symbols, or the like. The third manipulation unit 124 may operate as a hot key for performing a particular function such as activation of the first image input unit 115.

The interface 126 serves as a path for allowing the mobile terminal to exchange data with an external device. For example, the interface 126 may be implemented as one of a connection port (terminal) for connecting an ear phone to the mobile terminal via a fixed or wireless means, a port (e.g., an IrDA port), a Bluetooth™ port, a wireless LAN port, or a power supply port that supplies power to the mobile terminal, or the like.

The interface 126 may be a card socket (or receiving unit) for accommodating an external card, such as a Subscriber Identity Module (SIM), a User Identity Module (UIM), a memory card for storing information, or the like.

A power supply unit 127 for supplying power to the mobile terminal is mounted on the second body 120. The power supply unit 127 may be detachably combined to perform re-charging as a rechargeable battery.

A second image input unit 128 may be additionally mounted on the rear case 122 of the second body 120. The second image input unit 128 may have an image capture direction which is substantially the opposite to that of the first image input unit 115 (See FIG. 1), and may be a camera supporting a different number of pixels from that of the first image input unit 115.

For example, the first image input unit 115 may be used for low resolution (i.e., supporting a relatively small number of pixels) to quickly capture an image (or video) of the user's face and immediately transmit the same to the other party during video conferencing or the like. Meanwhile, the second image input unit 128 may be used for high resolution (i.e., supporting a relatively large number of pixels) in order to capture more detailed (higher quality) images (or video) which typically do not need to be transmitted immediately.

A flash 129 and a mirror 130 may be additionally disposed adjacent to the camera second input unit 128. When an image of the subject is captured with the second image input unit 128, the flash 129 illuminates the subject. The mirror 130 allows the user to see himself when he wants to capture his own image (i.e., self-image capturing) by using the second image input unit 128.

The second audio output unit 131 may be additionally disposed on the rear case 122.

The second audio output unit 131 may support stereophonic sound functions in conjunction with the first audio output unit 114 (See FIG. 1) and may also be used for sending and receiving calls in a speaker phone mode.

In the above description, the second image input unit 128, or the like, is disposed on the rear case 122, but the present invention is not meant to be limited. For example, one or more of the elements (128 to 131), which are disposed on the rear case 122, may be mounted on the first body 110, mainly, on the rear case 112. In this case, those elements disposed on the rear case 112 can be protected (or covered) by the second body 120 in the closed configuration. In addition, even if the second image input unit 128 is not provided, the first image input unit 115 may be configured to rotate (or otherwise be moved) to thus allow image capturing in various directions.

With reference to FIG. 3, in order to allow the first body 110 to slide with respect to the second body 120, the first and second bodies 110 and 120 are connected by a slide module 360. The slide module 360 is formed to slide the first body 110 with respect to the second body 120 between the closed configuration and the open configuration.

As the first body 110 slides by a large amount, a large area of the front surface of the second body 120 is exposed. As the exposed area is large, the hardware function of the terminal can be further improved. For example, the language keys and number keys of the second manipulation 123 (See FIG. 2) can be formed to be larger.

An example of a mobile terminal in which a plate-like object (e.g., a business card, a credit card, or the like) is prevented from being into a gap 180 formed between the first body 110 and the second body 120 in the open configuration to thus prevent damage to a flexible circuit board and allow the first body 110 to slide by a larger amount will now be described with reference to FIGS. 4 to 9.

Figure 4:
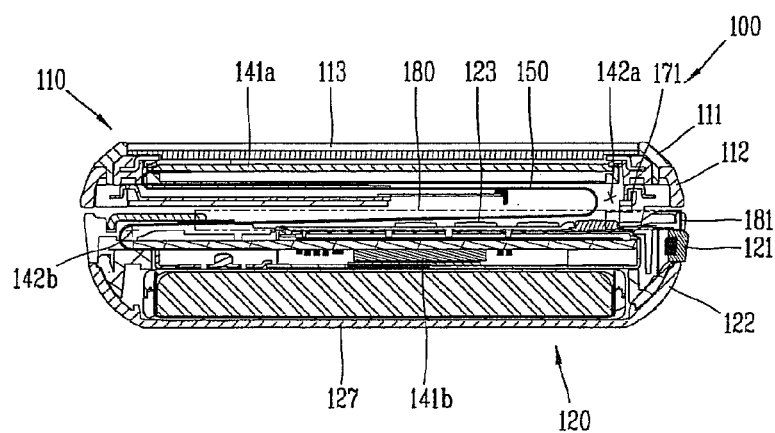
FIG. 4 is a sectional view taken along line IV-IV of FIG. 1.
Figure 5:
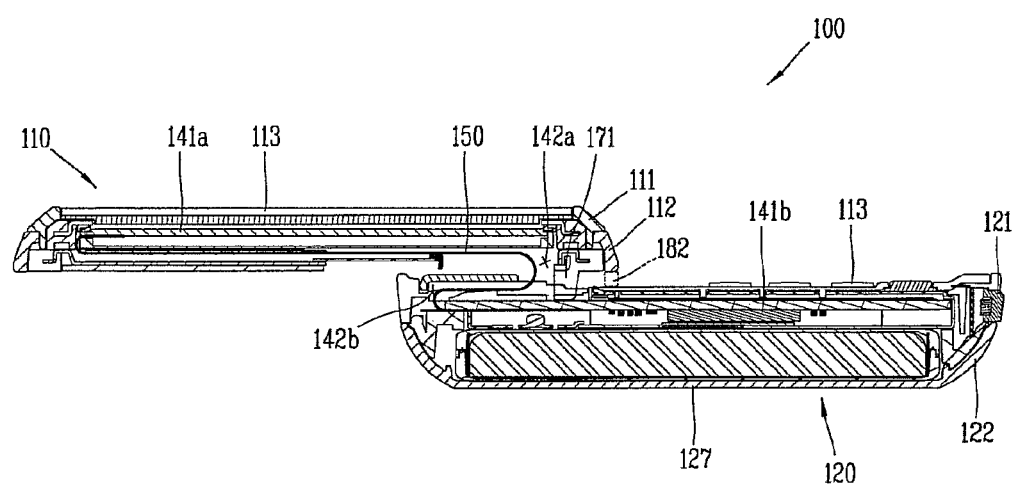
FIG. 5 is a sectional view showing an open configuration of the mobile terminal of FIG. 4.

FIG. 4 is a sectional view taken along line IV-IV of FIG. 1, and FIG. 5 is a sectional view showing an open configuration of the mobile terminal of FIG. 4. As illustrated, first and second electronic elements 141a and 141b are installed in the first and second bodies 110 and 120, respectively. The electronic elements 141a and 141b refer to electronic components, such as a display module, a circuit board, a camera, and the like, implementing various functions of the mobile terminal. With reference to FIG. 4, the first electronic element 141a may be the display module, and the second electronic element 141b may be a circuit board controlling the display module.

The first and second electronic elements 141a and 141b are electrically connected by a flexible circuit board 150. Accordingly, although electronic elements are installed in the interior of the first and second bodies 110 and 120, the electronic elements can interwork in the mobile terminal. For example, information input through the second manipulation unit 123 may be displayed on the display unit 113 (See FIG. 3).

The flexible circuit board 150 penetrates first and second openings 142a and 142b formed in the first and second bodies 110 and 120, respectively. The first and second openings 142a and 142b are formed to be adjacent to the end portions of the first and second bodies 110 and 120 which become close as the first body 110 slides from the closed configuration to the open configuration. With reference to FIGS. 4 and 5, the first opening 142a is disposed at a lower portion of the rear case 112 of the first body 110, and the second opening 142b is disposed at an upper portion of the front case 121 of the second body. The first and second openings 142a and 142b are formed at positions covered by the second and first bodies 120 and 110, respectively, so as not to be exposed to the outside in the closed configuration and open configuration.

As illustrated, the gap 180 is formed between the first and second bodies 110 and 120, and the flexible circuit board 150 electrically connects the first and second bodies 110 and 120 through the gap 180. In the open configuration, a plate-like thin structure such as a credit card, a business card, or the like, can be inserted into the gap 180. In this case, when the first body 110 slides to change the terminal into the closed configuration, the flexible circuit board 150 may be damaged by the structure. Thus, in order to prevent such damage to the flexible circuit board 150, blocking units 171 are formed on the first body toward the second body 120. Namely, the blocking units 171 are disposed in a space area 181 in proximity to the flexible circuit board 150 at an opening face of the gap 180.

The blocking units 171 are formed to cover at least a portion of the flexible circuit board 150, preventing a direct contact of a structure with the flexible circuit board 150 from the gap 180 at the side of the terminal. Also, the blocking units 171 may be formed to have a certain size in the space area 181 so as to prevent an external structure having a certain area from being inserted and prevent one surface of the external structure from extending to the flexible circuit board when the first body 110 slides.

A guide part 172 is formed between key buttons of the second manipulation unit. As shown in FIG. 2, the blocking units 171 move along the guide part 172 in the sliding direction. Also, the guide part 172 includes an insertion recess 172a to allow one end 173 of the blocking unit to be inserted thereinto. In a state in which the one end 173 of the blocking unit is coupled to the insertion recess 172a, the first body 110 slides, so the first body 110 can move stably without wobbling horizontally or vertically. Also, the first body 110 is firmly fixed according to the coupling between the insertion recess 172a and the blocking unit 171 in the open configuration, the open configuration can be maintained.

Also, when the open configuration is changed to the closed configuration, the first body slides to push out an external structure which is placed on the second manipulation unit or which may be inserted into the gap 180.

Figure 6:
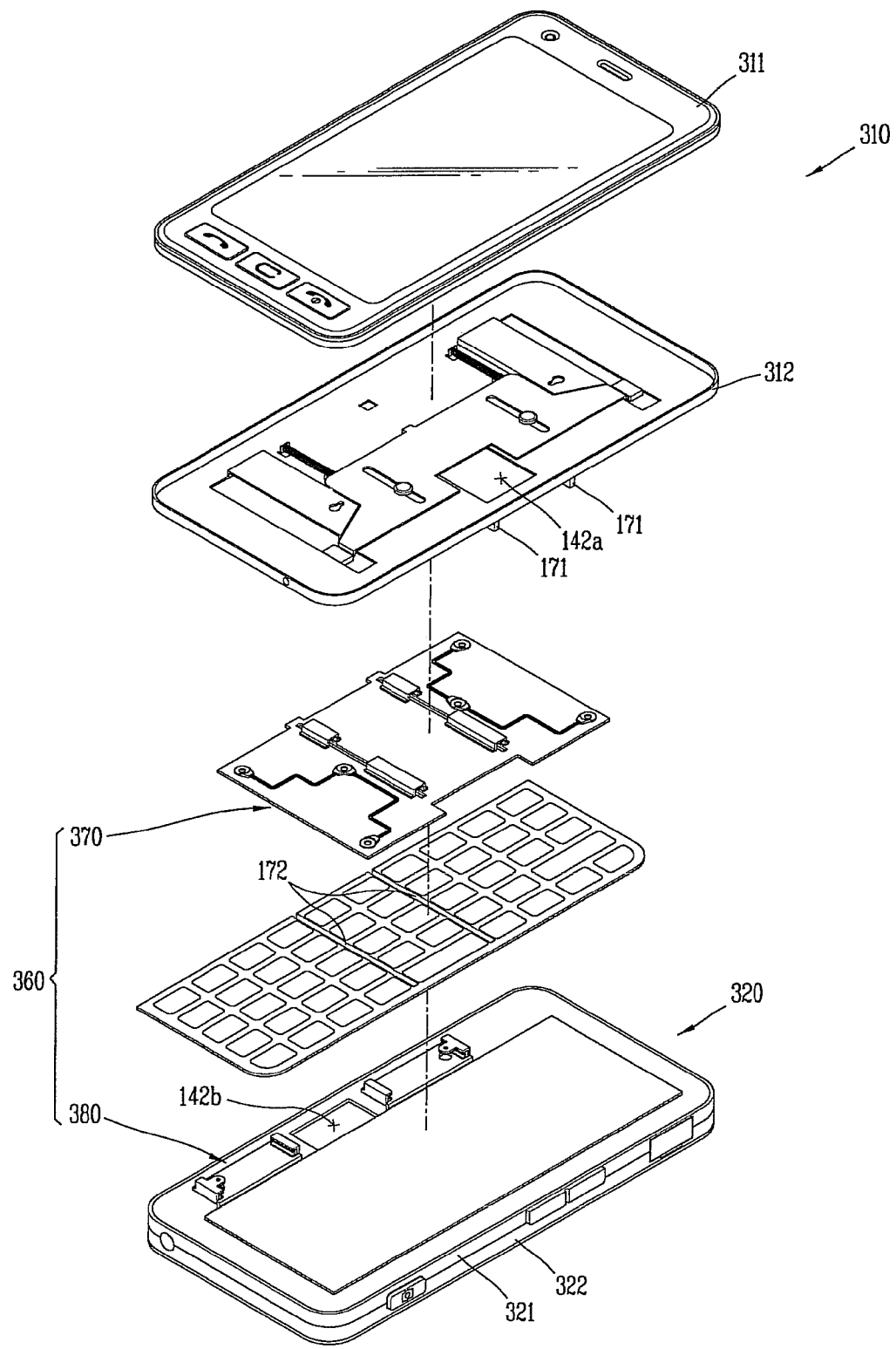
FIG. 6 is an exploded view showing first and second bodies of a mobile terminal according to an exemplary embodiment of the present invention.

FIG. 6 is an exploded view showing first and second bodies 310 and 320 of a mobile terminal according to another exemplary embodiment of the present invention.

A slide module 360 is provided between a first body 310 and a second body 320. The slide module 360 guides the first body 310 to slide with respect to the second body 320.

The slide module 360 includes first and second slide units 370 and 380.

With reference to FIG. 6, the first slide unit 370 is mounted on a rear case 312 of the first body 310. The first slide unit 370 may be made of metal such as stainless steel, or the like.

The second slide unit 380 is connected to the first slide unit 370 such that it is relatively slidable. The first slide unit 370 is configured to be protruded from one surface of the second body 320 facing the first body 310.

The second slide unit 380 is formed on one surface of a front case 321 forming an external appearance of the second body 320. Accordingly, the fabrication unit cost of the mobile terminal can be reduced. Namely, if a member having the second slide unit 380 is mounted on the front case 321, the number of the components and the fabrication processes would be increased. In the following description, the first slide unit 370 is mounted on the first body 310, but the present invention is not limited thereto. For example, the first and second slide units 370 and 380 may be formed on the second and first bodies 320 and 310, respectively.

The slide module 360 is formed to allow the first body 310 to be stopped at a certain position when the mobile terminal slides from the closed configuration to the open configuration. The slide module 360 may include an elastic module formed to apply an elastic force to the second slide unit 380 according to the sliding of the first slide unit 370.

Figure 7:
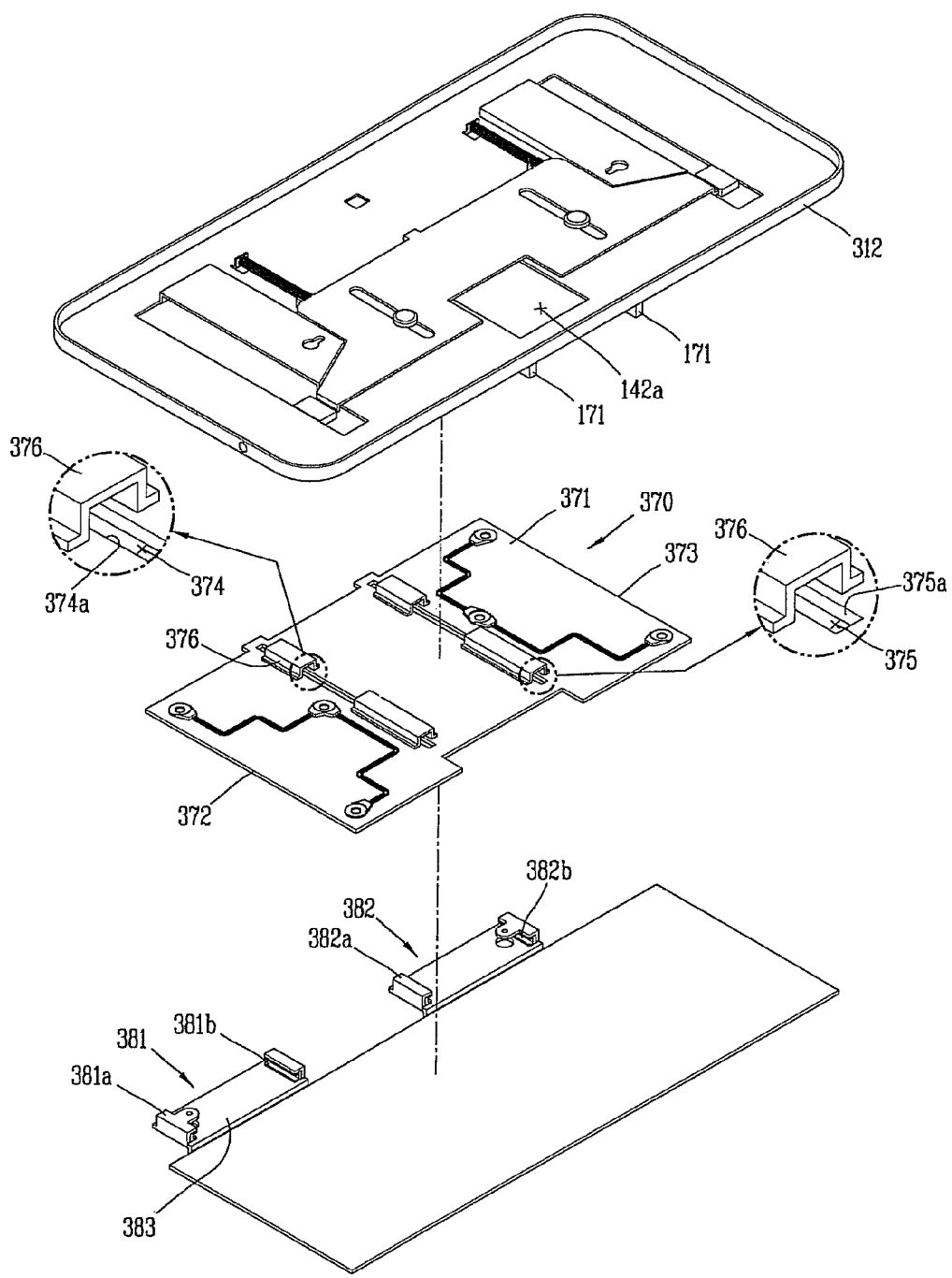
FIG. 7 is an exploded view of a slide module of FIG. 6.
Figure 8:
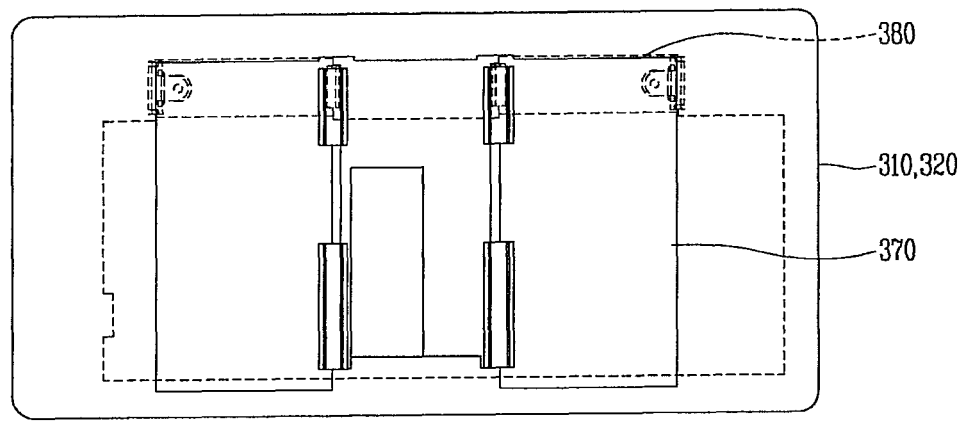
FIG. 8 is a plan view of the slide module of FIG. 6 in the closed configuration.
Figure 9:
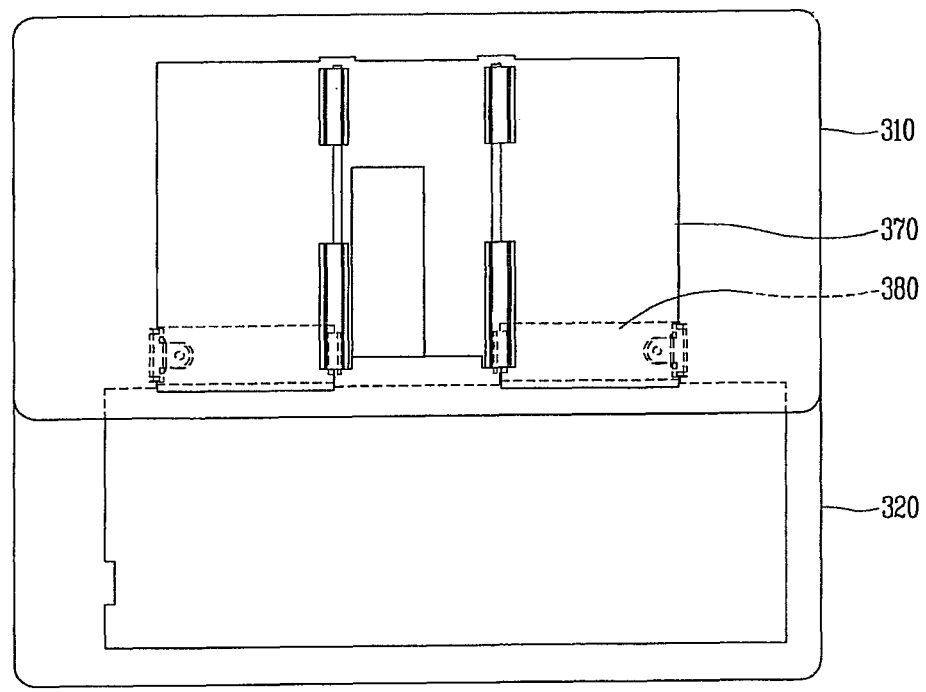
FIG. 9 is a plan view of the slide mode of FIG. 6 in the open configuration.

FIG. 7 is an exploded view of a slide module of FIG. 6, and FIGS. 8 and 9 show the slide module of FIG. 7 in the open configuration and in the closed configuration.

With reference to FIGS. 7, 8, and 9, the first slide unit 370 is formed in the form of a sheet. For example, the first slide unit 370 may be formed by performing press working on a sheet made of a stainless steel (SUS).

The first slide unit 370 includes a base plate 371, first and second guide edges 372 and 373, and first and second guide holes 374 and 375.

The base plate 371 is mounted on the first body 310. Specifically, the base plate 371 may be mounted on the rear case 312 through welding, or the like, and accordingly, the first body 310 can be formed to be thin in thickness.

The first and second guide edges 372 and 373 are formed at both edges of the base plate 371. The first and second guide edges 372 and 373 extend along the sliding direction of the first body 310 and disposed to be coplanar.

The first and second guide holes 374 and 375 are formed between the both edges of the base plate 371. The first and second guide holes 374 and 375 may be formed as through holes penetrating the base plate 371. The first and second guide holes 374 and 375 may be slots extending in the sliding direction. The first and second guide holes 374 and 375 may be formed at positions symmetrical to the center between the first and second guide edges 372 and 373.

A rigidity reinforcing unit 376 may be formed on the first slide unit 370 such that at least a portion thereof extends along the sliding direction, in order to reinforce the strength of the first slide unit 370.

The rigidity reinforcing unit 376 may be formed on one surface of the base plate 371. Both ends of the rigidity reinforcing unit 376 are protruded from the base plate 371 and cover at least one of the first and second guide holes 374 and 375. Accordingly, the rigidity and strength in the vicinity of the first and second guide holes 374 and 375 of the first slide unit 370 in the form of a sheet can be reinforced.

With reference to FIGS. 7, 8, and 9, the second slide unit 380 includes first and second rail units 381 and 382.

The first slide rail unit 381 is slidably coupled with a face 374a confining the first guide hole 374 and the first guide edge 372, and the second slide rail unit 382 is slidably coupled with a face 375a confining the second guide hole 375 and the second guide edge 373.

The first and second slide rail units 381 and 382 are disposed to be separated. With reference to the drawings, the first and second slide rail units 381 and 382 include a step face 383 and first and second guide rails 381a, 381b, 382a, and 382b.

The step face 383 is stepped with respect to one surface of the second body 320, e.g., one surface of the front case 321, and formed to be parallel to the one surface. The first and second guide rails 381a, 381b, 382a, and 382b are formed at both edges of the step face 383. The first and second guide rails 381a, 381b, 382a, and 382b are formed in a direction perpendicular to the sliding direction and are brought into contact with the first slide unit 370. The first and second guide rails 381a and 381b of the first slide rail unit 381 guide sliding on the face 374a confining the first guide edge 372 and the first guide hole 374, respectively, and the first and second guide rails 382a and 382b of the second slide rail unit 382 guide sliding on the face 375a confining the second guide edge 373 and the second guide hole 375, respectively. With reference to FIG. 7, the first and second guide rails 381a, 381b, 382a, and 382b have a channel-like shape which extends along the sliding direction overall.

A lubricant member may be disposed between the first and second slide units 370 and 380 in order to reduce a frictional contact therebetween. The lubricant member may be made of a synthetic resin, e.g., polyoxymethylene (POM).

With reference to FIGS. 8 and 9, when the first body 310 slides with respect to the second body 320 in the closed configuration, the second slide unit 380 is disposed to be adjacent to the other end of the first slide unit 370 at one end of the first slide unit 370 and the mobile terminal is in the open configuration.

As the first body 310 slides with respect to the second body 320, the second slide unit 380 is formed to be adjacent to both ends of the first body 310. Accordingly, the manipulation unit of the second body 320 does not overlap with the first body 310 and a larger portion of the manipulation unit can be exposed.

Also, since the first and second slide units 370 and 380 are coupled at a plurality of positions and the strength is reinforced by the rigidity reinforcing unit, a larger portion of the second body 320 is exposed in the open configuration, and although the contact area between the first and second slide units is small, the first and second bodies can be firmly coupled.

In the embodiments of the present invention, the above-described method can be implemented as software codes that can be read by a computer in a program-recorded medium. The computer-readable medium includes various types of recording devices in which data read by a computer system is stored. The computer-readable medium may include a ROM, a RAM, a CD-ROM, a magnetic tape, a floppy disk, an optical data storage device, and the like. The computer-readable medium also includes implementations in the form of carrier waves or signals (e.g., transmission via the Internet). The computer may include the controller 180 of the terminal.

As the exemplary embodiments may be implemented in several forms without departing from the characteristics thereof, it should also be understood that the above-described embodiments are not limited by any of the details of the foregoing description, unless otherwise specified, but rather should be construed broadly within its scope as defined in the appended claims. Therefore, various changes and modifications that fall within the scope of the claims, or equivalents of such scope are therefore intended to be embraced by the appended claims.

What is claimed is:

1. A mobile terminal comprising:
   first and second bodies slidably connected in a closed configuration and an open configuration;
   a flexible circuit board electrically connecting the first and second bodies and passing through a gap formed between the first and second bodies;
   one or more blocking units disposed in a spatial area formed from an opening face of the gap to the flexible circuit board and formed to be protruded from the first body to traverse the gap toward the second body, and
   a slide module formed to allow the first and second bodies to move relative to each other,
   wherein the blocking units are disposed in the spatial area to cover at least a portion of the flexible circuit board,
   wherein the slide module includes
   a first slide unit mounted on the first body, and
   a second slide unit slidably connected to the first slide unit and protruded from one surface of the second body facing the first body,
   wherein the first slide unit includes
   a base plate mounted on the first body,
   first and second guide edges formed at both corners of the base plate, and
   first and second guide recesses formed between both corners of the base plate and extending in the sliding direction,
   wherein the second slide unit includes
   a first slide rail unit slidably coupled to the first guide recess and the first guide edge, and
   a second slide rail unit slidably coupled to the second guide recess and the second guide edge, and
   wherein the first slide unit includes a rigidity reinforcing unit having at least a portion extending along the sliding direction to reinforce strength, having both ends protruded from the base plate, respectively, and having a portion, between the both ends, covering at least one of the first and second guide recesses.

2. The mobile terminal of claim 1, wherein a manipulation unit including a plurality of key buttons arranged thereon is formed on one surface of the second body.

3. The mobile terminal of claim 2, wherein a guide part is formed between the key buttons to allow one end of each of the blocking units to move in a sliding direction.

4. The mobile terminal of claim 3, wherein the guide part includes an insertion recess allowing one end of each of the blocking units to be inserted therein.

5. The mobile terminal of claim 1, wherein the flexible circuit board is formed to penetrate first and second openings formed at the first and second bodies, respectively, to electrically connect first and second electronic elements installed in the first and second bodies.

6. The mobile terminal of claim 1, wherein the second slide unit includes first and second slide rail units disposed to be spaced apart from each other and including rails facing to confine the first slide unit in a direction crossing the sliding direction.

7. The mobile terminal of claim 6, wherein the first and second slide rail units include: a step face formed on one surface of the second body such that it is parallel to the one surface of the second body; and first and second guide rails fainted at both corners of the step face and constituting the rails.

8. A mobile terminal comprising:
   a first body having a display unit formed on a front surface thereof to display visual information;
   a second body having a manipulation unit with a plurality of key buttons arranged on one surface thereof and slidably coupled to the first body to implement a closed configuration and an open configuration of the manipulation unit;
   a gap formed between the first and second bodies;
   a slide module formed to allow the first and second bodies to move relative to each other, and a blocking unit protruded toward the second body from the first body in order to push out an external structure through a sliding operation when at least a portion of the external structure is inserted to the gap, and formed to cover at least a portion of the gap, wherein the slide module includes a first slide unit mounted on the first body, and a second slide unit slidably connected to the first slide unit and protruded from one surface of the second body facing the first body, wherein the first slide unit includes a base plate mounted on the first body, first and second guide edges formed at both corners of the base plate, and first and second guide recesses formed between both corners of the base plate and extending in the sliding direction, wherein the second slide unit includes a first slide rail unit slidably coupled to the first guide recess and the first guide edge, and a second slide rail unit slidably coupled to the second guide recess and the second guide edge, and wherein the first slide unit includes a rigidity reinforcing unit having at least a portion extending along the sliding direction to reinforce strength, having both ends protruded from the base plate, respectively, and having a portion, between the both ends, covering at least one of the first and second guide recesses.

9. The mobile terminal of claim 8, wherein a guide part is formed between the key buttons to allow one end of the blocking unit to move in a sliding direction.

10. The mobile terminal of claim 9, wherein the guide part includes an insertion recess allowing one end of each of the blocking units to be inserted therein.

\* \* \* \* \*